Oct. 19, 1965

R. L. REES 3,212,484

SPEED CONTROL SYSTEM

Filed Sept. 7, 1962

SPRING CURVE

INVENTOR
Roy L. Rees

BY *Adolph P. Hugin*
ATTORNEY

Oct. 19, 1965   R. L. REES   3,212,484
SPEED CONTROL SYSTEM
Filed Sept. 7, 1962   2 Sheets-Sheet 2

INVENTOR
Roy L. Rees
BY Adolph E. Hugin
ATTORNEY

United States Patent Office 3,212,484
Patented Oct. 19, 1965

3,212,484
SPEED CONTROL SYSTEM
Roy L. Rees, R.F.D. 1, Hammond, Ill.
Filed Sept. 7, 1962, Ser. No. 221,958
5 Claims. (Cl. 123—102)

This invention relates to a speed control system for an engine-generator unit and particularly to a system for maintaining the speed of the driven generator substantially constant over wide load variations where the engine which comprises the prime mover of the unit is provided with a butterfly valve in the engine combustion mixture supply passage and this butterfly valve is controlled by a flyball governor.

Various types of speed control systems have been utilized for regulating the speed of a driven electric generator so as to maintain the speed thereof substantially constant. Where such speed control systems utilize governors for controlling the fuel mixture supply to a prime mover, it is inherently necessary for the engine-generator unit to change its speed in order to obtain a control response from the governor. Various types of governors have been provided for minimizing the speed change required to obtain the desired operation of the governor, and a variety of resilient biasing devices, such as compression and tension springs, have been used in order to assure the desired response of the governor to predetermined speed change conditions.

In order to obtain prompt and accurate response by speed governors, it has been the usual practice to drive such governors directly by the prime mover or by the generator driven by the prime mover. It has also been proposed to provide a speed governor drive by a synchronous motor which is energized by the generator of the engine-generator unit. With this latter type arrangement, the speed governor is always driven at a definite speed relation to the frequency of the alternating current generator of the engine-generator unit and, therefore, should respond directly to any variations in the generator speed.

An aspect of governor speed control for engine-generator units which has not been readily or effectively controlled is the fact that, in gas and gasoline engines, the vacuum-velocity forces on a governor-operated butterfly valve often vary greatly between open and closed positions of the valve. In some positions of a butterfly valve the manifold suction and the velocity of the combustion mixture impinging on the butterfly valve tend to work with the governor and, in other positions of the valve, these forces oppose the governors so that the regulation curve is not constant at all loads. This complicates the response to the governor control, particularly since a spring curve for most compression and tension springs is a substantially straight line.

In accordance with the present invention, a speed control system is provided wherein the response of the prime mover is extremely rapid and accurate so that the generator speed is maintained substantially constant or at least within an extremely narrow speed range from full to no-load conditions and even to substantial overloads and during rapid load fluctuations. This is obtained by a combination of features including the use of an asynchronous motor as a driving source for a spring-biased flyball governor which is energized by the alternating current generator of the engine-generator unit and by a gas-directing airfoil vane in the combustion mixture supply passage on the intake side of the butterfly valve which is controlled by the governor constructed and arranged so as to substantially equalize the vacuum-velocity forces on the butterfly valve between open and closed positions thereof.

An object of the present invention is to provide an improved engine-generator unit speed control system.

Another object of this invention is to provide an improved speed control system utilizing a spring-biased flyball governor driven by an asynchronous motor and connected to control the operation of a butterfly valve on the intake side of which a gas-directing airfoil vane is arranged.

A further object of the present invention is to provide an improved engine-generator unit speed control system utilizing a flyball governor for controlling a butterfly valve provided with a gas-directing vane on the intake side of the butterfly valve.

Yet another object of the present invention is to provide an improved engine-generator unit speed control system wherein a flyball governor controls a butterfly valve with a gas-directing vane positioned on the intake side of the valve for directing the flow of gas past the valve.

A still further object of the present invention is to provide an improved device for directing a combustion mixture past a butterfly valve which is controlled by a flyball governor.

Further objects and advantages of this invention will become apparent from the following description referring to the accompanying drawings, and the features of novelty which characterize this invention will be pointed out with particularity in the claims appended to and forming a part of this specification.

Figure 3:
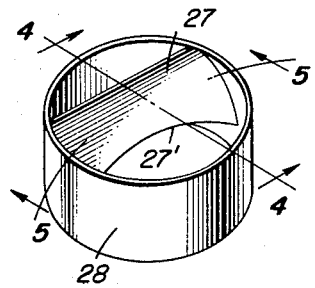
FIG. 3 is a perspective view of a gas-directing airfoil vane embodying the present invention which is adapted to be used in the system shown in FIG. 1.
Figure 4:
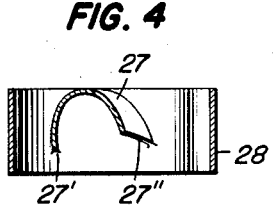
FIG. 4 is a sectional view, taken along line 4—4 of FIG. 3, illustrating the general contours and mounting of the airfoil vane shown in FIG. 3.
Figure 6:
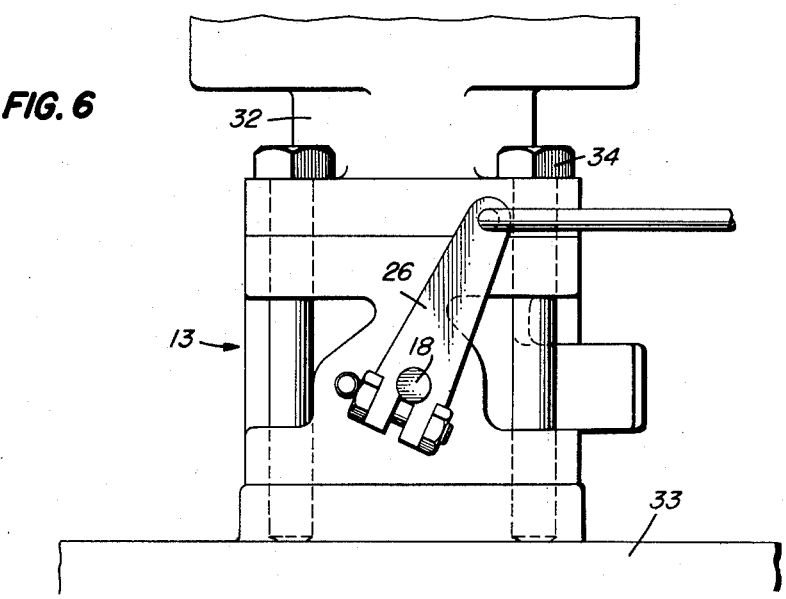
FIG. 6 is a side elevational view of a butterfly valve box between a carburetor and a manifold for controlling the combustion mixture passing through the combustion mixture passage which includes the valve box and the manifold which supplies the combustion mixture to the various cylinders of the internal combustion engine.
Figure 7:
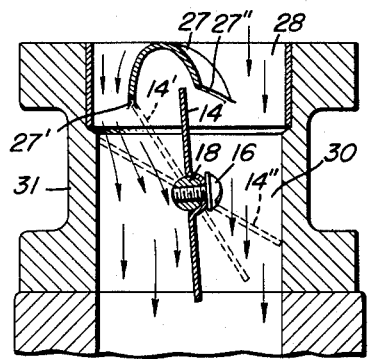
Figure 8:
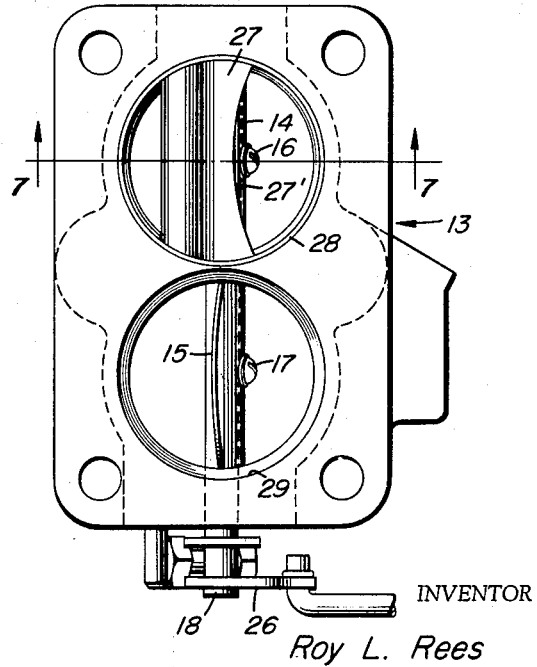

FIG. 7 is a sectional view, taken along line 7—7 of FIG. 8, showing in solid lines the relative arrangement of the airfoil vane illustrated in FIGS. 3 and 4 mounted in position in a valve box and illustrating the butterfly valve in full-open position, the half-open and closed positions of the valve being shown in dotted lines; and FIG. 8 is a plan view of the valve box shown in FIG. 6 with the carburetor and one of the airfoil vanes removed, illustrating the relative arrangement of the airfoil vane as it is mounted on the intake side of a butterfly valve and also illustrating the mounting for the valve in the valve box.

Referring to the drawings, an engine-generator unit speed control system is illustrated in connection with an internal combustion engine 10 which serves as the prime mover for the system and is coupled in any suitable manner, as by pulleys and a drive belt or a flexible coupling, to an alternating current generator 11, shown as a three-phase alternator. This three-phase alternator may be used to supply any desired three-phase load, such as a welding load, to be connected to generator terminals 12. The internal combustion engine may be of the gas or gasoline type to which a combustion mixture is supplied from a suitable source and is adapted to be controlled by a butterfly valve assembly 13. In the detailed illustration shown in FIG. 8, the butterfly valve assembly is shown as a double barreled valve comprising two butterfly valves 14 and 15 mounted by screws 16 and 17 respectively on a common valve shaft 18, the invention is equally useful with single or multiple barrel valves.

Figure 1:
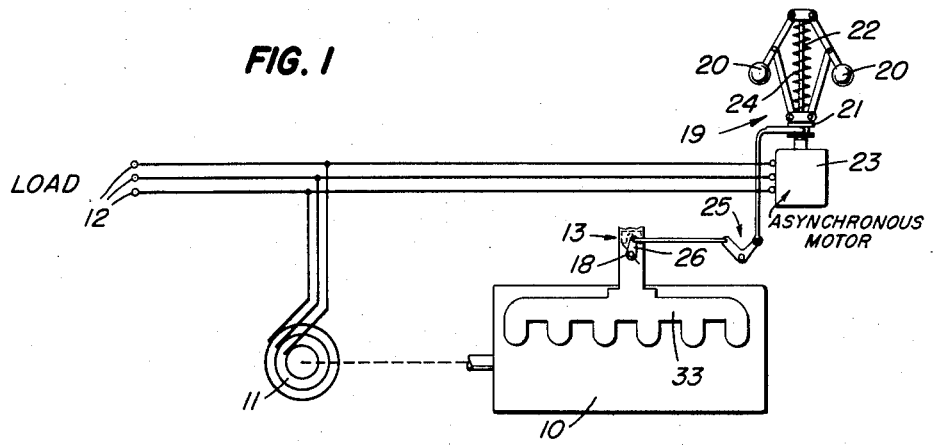
FIG. 1 is a schematic illustration of an engine-generator unit provided with a speed control system embodying the present invention.

The speed control system includes, in addition to the valve assembly 13, a governor mechanism 19 which comprises a suitable flyball governor having an operating collar 21 operable by flyballs 20 of the governor for axial movement along a governor drive shaft 22, which is adapted to be driven by an asynchronous motor 23. A suitable biasing spring 24 is provided for the governor mechanism 19 against which the flyballs 20 operate in moving an operating collar 21 slidably mounted on the governor shaft 22. This spring may be of the simple single type or may comprise a compound spring and also may be of the compression or tension variety. In the schematic illustration of FIG. 1 it is shown as a single compression spring 24.

Figure 2:
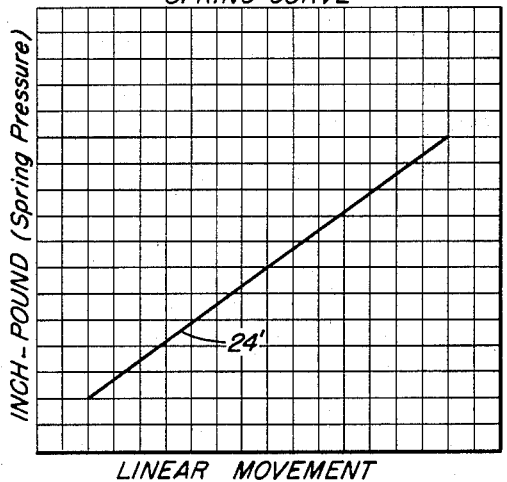
FIG. 2 illustrates a spring curve showing the conventional relationship of the spring pressure or tension in response to its linear deformation.

Flyball governor springs have, in general, a common characteristic in that the spring curve 24', FIG. 2, that is, the representation of the relationship of the spring displacement to the force exerted by the spring, or the torque on the rocker shaft in inch-pounds where a rocker shaft is used with the flyball governor, is a straight line. With this type of characteristic a given linear deformation of the governor spring produces a given constant force.

Operation of a flyball governor of any type is obtained by movement of an operating member, such as the collar 21, and this occurs when the force of the biasing spring is different from the force exerted on the collar by the flyballs. The movement of the operating collar 21 ceases when the spring force and the centrifugal force of the flyballs on the collar 21 are equal. Since the centrifugal force effect of the flyballs varies in accordance with the distance of the flyballs from the axis of the governor shaft 22, the regulation obtained by a flyball centrifugal governor varies continuously from the closed position of the weights to their open position. This is, of course, due to the fact that, as the weights or flyballs swing outwardly, the radius of the rotating mass of these flyballs increases and, as they swing inwardly, this radius decreases. Similarly, the spring force of the biasing spring, such as the compression spring 24, is less when it is expanded due to the closed position of the flyballs than when it is compressed due to the open position of the flyballs.

As a rule, conventional flyball governors are designed to provide the desired movement of the operating member, such as the collar 21, by relatively slight changes in the speed of rotation of the flyballs. Thus, if more load is placed on the engine which is controlled by the governor, its speed tends to decrease slightly and the flyballs close correspondingly, since the centrifugal force at the lower speed is not sufficient to balance the force of the biasing spring. This results in a movement of the operating member, such as the collar 21 which is connected through a suitable linkage 25 to a butterfly valve operating crank 26, so as to move the crank 26 to a position which opens the butterfly valve and thereby feeds more combustion mixture to the engine 10. This increases the engine output which results in an increase in the engine speed and, therefore, an increase in the governor speed, until the speed of the flyballs again develops a sufficient centrifugal force against the biasing force of the governor spring to restore the governor mechanism to a stable balanced operating condition at the desired substantially constant speed. This theoretical operation of a flyball governor is well understood, but is not attainable in actual practice. The stable operating condition which is obtained by a governor for no-load on an engine usually is different from that which is obtained at full load, and this difference is expressed in various ways, such as in a percentage variation between the speeds at full load and no-load, or as a difference in these speeds, and is generally expressed as the regulation of the equipment. Where the engine which is controlled by such a governor is used to drive an alternating electric generator, the regulation also is expressed in terms of cycles per second. For most electrical applications it is desirable to minimize this regulation, since it affects the operating speed of most rotating equipment connected to the generator and also may result in a variation in the voltage of the system.

In accordance with the present invention, a combination of features is provided in the control system which acts in concert to maintain the regulation of the engine-generator unit to a very minimum and, in most instance, to an almost imperceptible change in speed from no-load to full load, as well as under relatively rapid load variations. This close regulation is obtained by the combination of features in such a way as to prevent hunting in the system and utilizes both electrical and mechanical operating characteristics of the speed control system to attain this highly desirable result.

In accordance with the present invention, the flyball governor mechanism 19 is driven by the asynchronous motor 23 which may comprise a suitable three-phase induction motor energized by the three phases of the alternating current generator 11. As is well konwn, such induction motors operate at a speed which depends upon the number of poles and the frequency of the energizing current. In addition, in order to obtain an induced electromotive force and a consequent energizing current in the winding of an induction motor to which the energy is transmitted by electromagnetic induction, it is necessary that there be a difference between the rotation of the electromagnetic field set up by the exciting alternating current in the winding connected to a source of electrical power and the speed of rotation of the winding into which the energy is transmitted by electromagnetic induction. This difference in speed of rotation is known as the slip of the induction motor and is necessary for the operation of all motors of this type. Thus, when the stator of an induction motor is energized by an alternating current, the rotor of the induction motor operates at a subsynchronous speed which approaches synchronous speed at no-load. Since the rotor of an induction motor inherently must operate at a speed lower than normally would be attained by the rotor of a synchronous motor, a decrease in the frequency of the energization of the stator winding of an induction motor results in a further decrease in the speed of the induction motor rotor. In the present invention, advantage is taken of this inherent characteristic of an induction motor to operate asynchronously by connecting the stator of the governor-driving induction motor for energization by the alternating current generator 11. In addition, the governor-driving motor 23 preferably is one which is wound with a number of poles such that it will operate at a speed higher than the desired speed of the alternating current generator 11. The result is that a cumulative governor speed change is produced. For instance, if the governor-driving motor 23 were rated to operate at substantially twice the speed of the alternating current generator 11, a change in the speed of the generator 11, which would result in a change in its terminal frequency of half of cycle per second, would inherently produce at least twice as great a change in speed in the governor-driving motor 23. Actually, more than twice this change would result due to the inherent slip required for the operation of an induction motor. Thus, the change in frequency of the generator is impressed on the asynchronous induction motor 23, and it, in turn, operates at a speed which produces a cumulative change in the speed of the flyball governor. This causes the governor to respond more rapidly and to a greater degree to a change in speed of the generator 11 than would be provided were the governor to be driven directly by the prime mover engine 10. The result is that there is a much more sensitive response and control of the prime mover speed by such a drive than could be obtained by a direct drive of the governor or by a drive of the governor through a synchronous motor.

As is well known in the internal combustion engine field, the vacuum-velocity forces on a butterfly valve controlling the supply of combustion mixture to the engine often vary greatly between open and closed positions of the valve. These inherently affect the accuracy of the control provided by a governor aranged to operate such a butterfly valve. In order to provide the desired response of the prime mover to the improved governor control according to the present invention, applicant has provided a gas-directing airfoil vane for substantially equalizing the vacuum-velocity forces on the butterfly valve throughout its normal operating range between open and closed positions.

In the illustrated embodiment, this modification of the vacuum-velocity forces on the butterfly valve is provided by an airfoil vane 27 which extends generally axially in the direction of the axis of the butterfly valve, that is, generally in the direction of the valve shaft 18. The airfoil curved surface of the vane 27 is presented in the direction of the combustion mixture flow, as is more clearly illustrated by the arrows in FIG. 7, and toward the source of the combustion mixture. In order to facilitate mounting of the vane in the desired position, this vane 27 preferably is preformed and secured in a mounting ring 28 which may be conveniently press fitted into a suitable enlarged seat 29 which can readily be reamed out of the normal engine combustion mixture passage 30 through the valve box 31. This valve box 31 otherwise is of a conventional type and is adapted to be suitably mounted between a carburetor 32 and a combustion mixture distributing manifold 33. Bolts 34 or other suitable fastening elements are provided for normally mounting the valve box 31 in position between the carburetor 32 and the distributing manifold 33. This mounting also will assure the secure positioning of the gas-directing airfoil vane 27 once the valve box 31 has been mounted in position on an engine, as the normal size of the combustion mixture passage in the throat of the carburetor 32 adjacent to the valve box 31 will be of the same size as the passage 30 in the valve box and, therefore, will serve to clamp the vane mounting ring 28 in position in the seat 29 of the valve box. In most cases, the simple press fit of the mounting ring 28 in the valve box will be sufficient to hold the vane in position.

Figure 5:
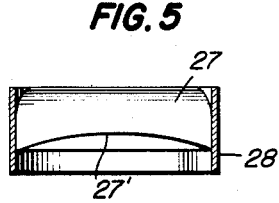
FIG. 5 is a sectional view, taken along line 5—5 of FIG. 3, illustrating the general transverse or axial mounting of the vane in its mounting ring.

While various types of vanes may be utilized for modifying the vacuum-velocity forces on the butterfly valve, it has been found by actual tests that a highly desirable airfoil vane configuration is one which has a width of substantialy the diameter of the mixture passage 30 along the axis of the valve and an airfoil thickness substantially equal to the cord of the arc of travel between full-open and half-open positions of the center of the edge of the valve-leading wing. It preferably also is positioned in the mixture supply passage on the intake side of the valve in the path of flow directed toward the valve-leading wing from substantially its full-open position to its half-open position. This restricts the cross-sectional area on the valve leading wing side of the combustion mixture supply passage to a fracton of its full area and redirects the flow of combustion mixture over the valve. Preferably, the vane also is secured in the mounting ring 28 so that it is tilted angularly generally from the full-open position of the valve 14, as indicated by the solid lines in FIG. 7, toward the half-open position of the valve, as indicated at 14′ in FIG. 7. The fully closed position of the valve is shown by the dotted line 14″ in this figure. As is more clearly shown in the detailed views of FIGS. 3, 5, and 8, the airfoil vane 27 preferably is a hollow sheet metal structure, and the edges 27′ and 27″ of the vane are curved so as to provide a slight clearance between the outer edge of the leading wing of the butterfly valve 14 and these edges of the vane. This assures a free operation of the valve and appears to provide the best redirection of the combustion mixture flow.

The exact redirection of the gas flow over the valve which produces the desired effects is not definitely known; however, since the general flow of gas over airfoil surfaces has been widely investigated, it is probable that the gas flows somewhat as indicated by the arrows in FIG. 7 so as to equalize the resistance of the valve on the governor for all of its operating positions. As shown in this figure, the airfoil vane 27 is mounted asymmetrically transversely of the supply passage so as to offer substantially no restriction on the windward side of the trailing edge half of the butterfly valve 14; i.e., on the side of the passage toward which the trailing edge of the valve is movable when closing the valve; whereas, it offers a definite restriction to the flow of gas mixture, with a consequent redirection thereof, toward the leeward side of the valve; i.e., on the side of the passage toward which the leading edge of the valve is movable when closing the valve. This provides for a more uniform and direct proportional control of the flow of gas through the valve box by the operation of the flyball governor than has heretofore been obtainable, and the combination of this airfoil structure, together with the asynchronous electric motor drive of the flyball governor, provides a more highly improved regulation to the engine-generator unit than has been obtainable by any known conventional governor control speed regulator for such a unit.

While a particular embodiment of this invention has been illustrated and described, modifications thereof will occur to those skilled in the art. It is to be understood, therefore, that this invention is not to be limited to the particular details disclosed, and it is intended in the appended claims to cover all modifications within the spirit and scope of this invention.

What is claimed is:

1. A speed control system for an engine-generator unit including
    a combustion mixture supply passage and a butterfly valve in the engine combustion mixture supply passage operable around an axis from closed to open positions by turning a valve leading wing toward and a valve trailing wing away from the source of the combustion mixture,
    a spring-biased flyball governor, means operably connecting said governor to said valve for controlling the operation of said butterfly valve, and
    means including a gas directing airfoil vane extending generally axially in the direction of said valve axis and presenting its airfoil curved surface in the direction of combustion mixture flow and toward the source thereof,
    said vane being positioned in said mixture supply passage on the intake side of said valve and in the path of flow directed toward said valve leading wing and being of a size to restrict the cross-sectional area of said supply passage on the valve leading wing side thereof to a fraction of its full area and mounted transversely asymmetrically of said passage for restricting the combustion mixture flow toward the leeward side of said valve with substantially no restriction of said flow toward the windward side of said valve.

2. A speed control system for an engine-generator unit including
    a combustion mixture supply passage and a butterfly valve in the engine combustion mixture supply passage operable around an axis from closed to open positions by turning a valve leading wing toward and a valve trailing wing away from the source of the combustion mixture,
    a spring-biased flyball governor, means operably connecting said governor to said valve for controlling the operation of said butterfly valve, said generator of said engine-generator unit being an alternating current generator, an asynchronous motor energized by said generator and mechanically coupled to drive said governor, and means for substantially equalizing the vacuum-velocity forces on said butterfly valve between open and closed positions including a gas directing airfoil vane extending generally axially in the direction of said valve axis and presenting its airfoil curved surface in the direction of combustion mixture flow and toward the source thereof, said vane being positioned transversely asymmetrically in said mixture supply passage on the intake side of said valve and in the path of flow directed toward said valve leading wing and restricting the cross-sectional area on the valve leading wing side of said supply passage and redirecting the flow of the combustion mixture flow toward the leeward side of said valve with substantially no restriction of said flow toward the windward side of said valve.

3. In a speed control system for an engine having a spring-biased flyball governor for controlling the combustion mixture thereto by operation of a butterfly valve in the mixture supply passage of the engine, means including a single gas directing airfoil vane extending generally axially in the direction of the pivotal axis of the butterfly valve and presenting its airfoil curved surface in the general direction of combustion mixture flow and toward the source thereof substantially perpendicular to the valve axis, said vane being positioned transversely asymmetrically in the mixture supply passage in the path of flow directed toward the valve leading wing on the intake side of the valve and from substantially its full-open position to about its half-open position and tilted angularly generally from the full-open toward the half-open valve positions for restricting the combustion mixture flow toward the leeward side of said valve with substantially no restriction of said flow toward the windward side of said valve.

4. In a speed control system for an engine having a spring-biased flyball governor for controlling the combustion mixture thereto by operation of a butterfly valve in the mixture supply passage of the engine, means for modifying the vacuum-velocity forces on the butterfly valve between open and closed positions including a gas directing airfoil vane extending generally axially in the direction of the pivotal axis of the butterfly valve and presenting its airfoil curved surface in the general direction of combustion mixture flow and having a width of substantially the diameter of the mixture passage along the axis of the valve, said vane being positioned in the mixture supply passage on the intake side of the valve and in the path of flow directed toward the valve leading wing from substantially its full-open position to about its half-open position and tilted angularly generally from the full-open toward the half-open valve positions and having an airfoil thickness such as to restrict the cross-sectional area of the mixture supply passage on the valve leading wing side thereof and redirecting the flow of the combustion mixture over the valve.

5. In a speed control system for an engine having a spring-biased flyball governor for controlling the combustion mixture thereto by operation of a butterfly valve in the mixture supply passage of the engine, means including a single gas directing airfoil vane extending generally axially in the direction of the pivotal axis of the butterfly valve and presenting its airfoil curved surface in the general direction of combustion mixture flow and having a width of substantially the diameter of the mixture passage along the axis of the valve, said vane having a maximum airfoil thickness substantially equal to the cord of the arc of travel between full-open and half-open positions of the center of the edge of the valve leading wing and being positioned transversely asymmetrically in the mixture supply passage in the path of flow directed toward the valve leading wing on the intake side of the valve from substantially its full-open position to about its half-open position for restricting the combustion mixture flow toward the leeward side of said valve with substantially no restriction toward the windward side of said valve.

References Cited by the Examiner

UNITED STATES PATENTS

| | | | |
|---|---|---|---|
| 799,459 | 9/05 | Duffing | 123—97 |
| 1,884,043 | 10/32 | Martin. | |
| 1,959,163 | 5/34 | Hamilton et al. | 290—40 |
| 2,011,859 | 8/35 | Kalin. | |
| 2,369,426 | 2/45 | Benjamin | 123—108 |
| 2,577,435 | 12/51 | Siebenthaler | 261—38 |
| 2,632,856 | 3/53 | Dupy | 290—40 |
| 2,988,074 | 6/61 | Lobdell et al. | 123—97 |

MARK NEWMAN, *Primary Examiner.*

ORIS L. RADER, RICHARD B. WILKINSON,
*Examiners.*